United States Patent [19]
Keating

[11] 3,716,140
[45] Feb. 13, 1973

[54] COOKING FAT FILTER WITH FAST START-UP

[76] Inventor: Richard T. Keating, 4301 West Madison Street, Chicago, Ill. 60624

[22] Filed: April 2, 1971

[21] Appl. No.: 130,579

[52] U.S. Cl. ............... 210/167, 99/406, 210/DIG. 8
[51] Int. Cl. ............................................. B01d 35/00
[58] Field of Search ............... 99/403, 407, 408, 406; 210/167, 184, 456, DIG. 8

[56] References Cited

UNITED STATES PATENTS

| | | | |
|---|---|---|---|
| 2,287,396 | 6/1942 | Roth | 99/408 |
| 3,337,055 | 8/1967 | Starnes et al. | 210/DIG. 8 |

Primary Examiner—Samih N. Zaharna
Assistant Examiner—T. A. Granger
Attorney—Rummler & Snow

[57] ABSTRACT

A cooking fat filter constructed with the upper edge of the fat vessel low relative to the floor so that it may be used in conjunction with fat fryers having a gravity drain, said vessel having a shallow sump subtended therefrom, there being a suction tube opening in and adjacent the bottom of the sump, said suction tube being inclined downwardly to the sump from a pump inlet and said tube having a by-pass hole opening to the sump above the level of all melted fat back-drained to the sump from pump-fryer return conduit system following filter shut-down, said hole bypassing hot liquid fat from the vessel to the suction tube during start-up and quickly melting solidified drainage fat stopped up therein, thereby dispensing with the time-consuming need to clean or drain the fat flow system after filter shut-down.

3 Claims, 4 Drawing Figures

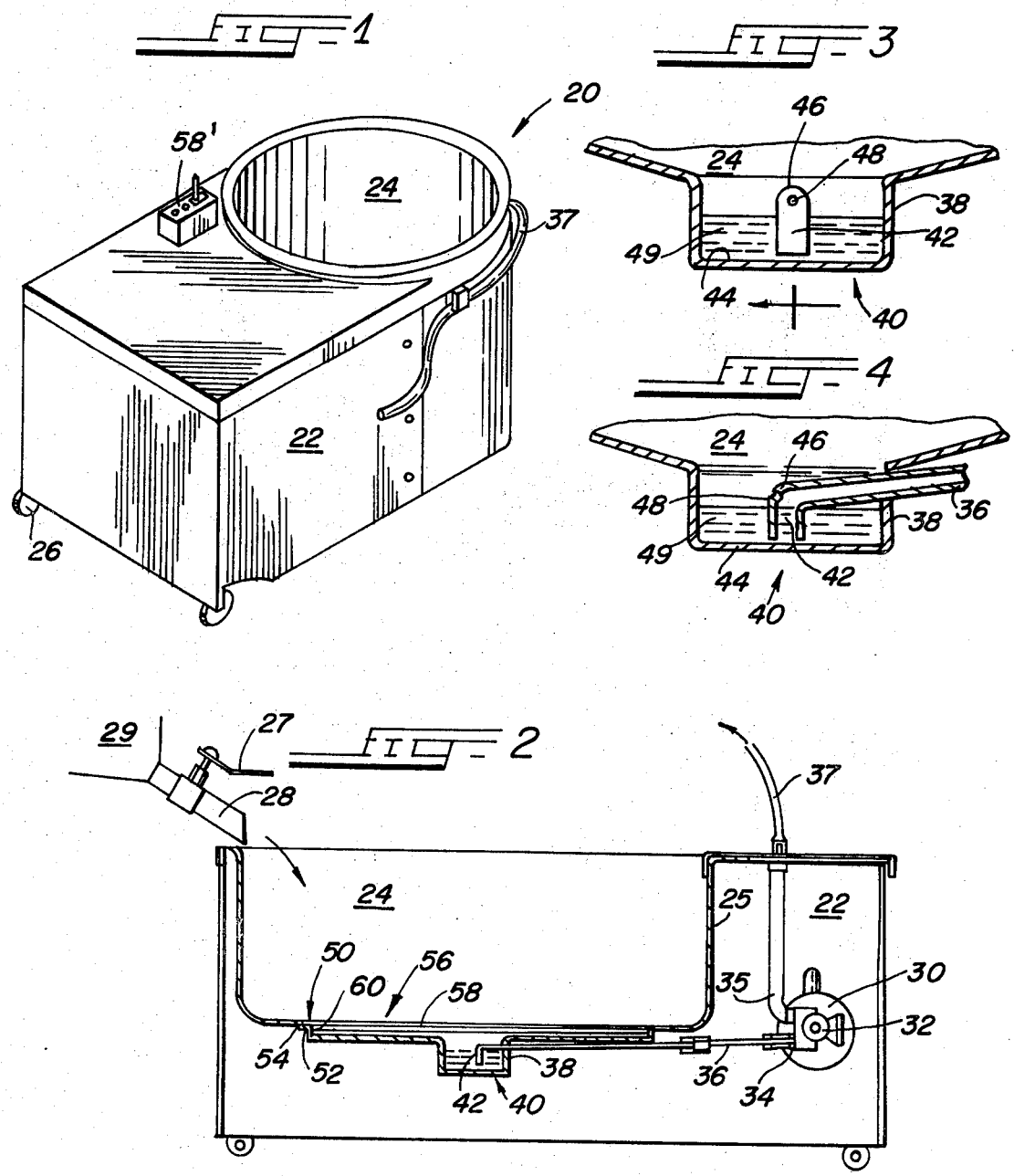

COOKING FAT FILTER WITH FAST START-UP

BACKGROUND OF THE INVENTION

This invention relates to liquid filter apparatus with a gravity drain fill, and more particularly to an apparatus for quickly and cleanly filtering a liquid cooking fat without risk of rancidity.

The present invention was developed for use in conjunction with deep fat fryers for purifying liquid edible fat commonly used in the preparation of French fries, pastries or fat fried food products. In general, these filters are constructed of a shallow vessel overlying a subtended sump. The hot fat from the fryer to be filtered flows gravitationally into the vessel and after passing through a filter screen, flows into the sump from which it is removed up a suction tube by a pump and delivered back to the fryer through a flexible hose.

A difficulty with regard to the operation of conventional cooking fat filters has rested in the solidification of residual fat left in the pump-fryer return piping following shut-down of the pump and filter at the end of the working day. This residual fat drains back into the sump where it sits overnight, solidifies and stops up the inlet to the pump, presenting a blockage situation which is extremely inaccessible to standard equipment cleaning techniques, delaying start-up interminably the following morning. Basically the prior art has dealt with this problem by either valving this residual fat as a hot liquid out to an external drain immediately after shut-down or by physically removing this fat from around the suction tube opening in the sump by spoon or spatula after fat solidification prior to start-up. Electrical heating of the suction tube has also been used to liquify the fat therein and clear out the solidified blockage in preparation for start-up, but this is time-consuming.

A more-or-less conventional way of dealing with the residual cooking fat problems is as follows. After this filter is used, the fat is pumped out of the vessel through an opening centrally located in the bottom of a sump subtended to the vessel. At the lowest point in the piping leading from this opening to the pump inlet, a drain petcock is installed to facilitate draining of all liquid from the sump and the piping. When the pump is turned off, the residual fat in the pump and its discharge plumbing drains back and fills this sump. If this petcock is not soon opened to drain, the sump fills with fat which sits overnight and solidifies. Then, in order to get the filter in readiness for operation the next morning, it is necessary for the operator to use a special electrical heating system, or wait for some rather indefinite time for hot liquid fat from the fryer to permeate the system and melt any residual fat in the filter thus clearing the flow conduits of all solidified fat. If the petcock is opened, a receptacle must be used to catch the fat and this can be messy.

This points up the main difficulties with prior art devices. Most important is the problem of the solidification of fat in the pipe and valves included in the liquid transfer system after the device has been used. This fat is inaccessible and can normally be removed only by melting. Where removal of this fat is by special valving, these devices are more complex in construction and operation. This is especially objectionable in a field where operational simplicity is exceedingly desirable because these devices are run by unskilled kitchen help.

Gedrich U.S. Pat. No. 3,263,818 illustrates one of these complex devices that the present invention is intended to supplement. Starnes U.S. Pat. No. 3,337,055 illustrates the conventional way of draining the residual fat by means of a simple petcock at the low point in the system. Morton U.S. Pat. No. 2,698,092 shows an electrically heated piping system designed to deal with the fat solidification problem.

SUMMARY OF THE INVENTION

The cooking fat filter of the present invention dispenses with much disagreeable chore work in kitchen management by providing for rancid-free filtering of cooking fat with faster, simpler start-up and without the need for petcock drain or spoon and spatula fat removal following filter shut-down. Many side benefits accrue with the start-up and shut-off cycles of this invention. Whereas with prior art devices complex procedural steps were required of the operator in the start-up cycle, i.e., switches and selector valves or petcocks must be timely and sequentially opened and closed, or sumps physically cleansed on a regular basis after shut-down, the cooking fat filter of this invention requires only to be turned "on" to be fully operational and "off" to be not. No timing or waiting or cleaning is involved. The start-up and shut-off cycles of the fat filter of this invention are quick and clean.

The gist of this invention lies in a cooking fat filter having a low profile so that it may be used with fat fryers having a gravity drain wherein a pump suction tube inclines downwardly from the pump inlet to the bottom of the filter vessel sump and enters the sump through an opening in the sump side wall where the tube is welded in place. The suction end of this tube is curved downwardly so that its open end is disposed about one-sixteenth of an inch above the bottom of the sump to insure removal of as much as is reasonably possible of the filtered fat before filter shut-down. Near the bend in this tube in the sump, just above the level of all solidified fat that may have drained back into the sump from the suction tube, pump and flexible hose system following shut-down, is or restricted orifice having a diameter less than one-half the diameter of the suction conduit means opening into pump suction tube. For minimum start-up time the volume of the sump when filled with fat to a level just below the by-pass hole exactly equals the drain-back quantity. The limiting design consideration for low-profile cooking fat filters dictates that the level of the drain-back fat in the sump must be below the level of the pump inlet by a sufficient margin to ensure back drain of the pump on shut-down but not so great as to impose a suction head on the pump during operation which will depreciate pump performance.

In start-up of the system, the sump being substantially filled with solidified residual fat drained back from the sump and suction tube, the function of this by-pass hole is as follows: Hot fat from the fryer is first gravity-drained into the filter vessel. This liquid fat floods the sump, already containing solidified fat, and covers the by-pass hole in the suction tube. A small portion of this hot liquid fat initially gains access to the interior of the suction tube through this hole. This fat quickly heats the tube and melts its way into the suction end of the pump suction tube thereby liquifying any residual solidified fat retained inside immediately clearing it of stopped-up solid fat so that the pump can begin to draw liquid fat from the sump. In a short time, all solidified fat in the sump and suction tube is thus liquified so that a fully liquid transfer system soon becomes fully operational.

With the foregoing considerations in mind, it is the principal object of this invention to provide a simple cooking fat filtering system which features a fast start-up for which the operator does not have to wait an indefinite time to become fully operational and which has a clean shut-off which does not require the operator to physically remove or drain fat from the liquid transfer system and sump.

Other objects and important features of the invention will be apparent from a study of the following specification taken with the drawings, which together describe and illustrate a specific embodiment of this invention, and what is now considered to be the best mode of practicing the principles thereof. Other embodiments may be suggested to those having the benefit of the teachings herein, and such other embodiments are intended to be reserved especially as they fall within the scope and spirit of the subjoined claims.

BRIEF DESCRIPTION OF THE DRAWINGS

In order to demonstrate the invention, reference is made to the specific embodiment illustrated by the drawings, in which reference numbers refer to elements of the invention herein disclosed.

FIG. 1 is a perspective view of a cooking fat filter constructed in accordance with the present invention;

FIG. 2 is a cross-sectional side view of a cooking fat filter showing the downwardly inclined suction tube connected to the pump inlet and having a bend in the end of the tube to place the end opening thereof close to the bottom of the sump with a hot fat by-pass hole though the tube wall adjacent said bend for entry of hot liquid fat from the vessel into the suction tube and at a level for minimum start-up time;

FIG. 3 is a fragmentary sectional view of the sump showing the bend in the suction tube and the fat by-pass hole through the tube wall adjacent the top of said bend; and FIG. 4 is a fragmentary sectional end view of the sump showing a side view of the bend in the suction tube and a preferred location of the fat by-pass hole through the tube wall.

DESCRIPTION OF THE PREFERRED EMBODIMENT

Referring now to FIGS. 1 and 2, there is shown one embodiment of a cooking fat filter 20 with fast start-up and clean shut-down comprising a base 22 supporting a substantially cylindrical bowl 24. The unit is portable, having base 22 mounted on casters 26. The cooking fat filter 20 is constructed so that the upper edge of side wall 25 of vessel 24 is low enough, relative to the floor, that it may be used in conjunction with fat fryer 29 having a gravity drain which will empty the fat by spigot valve 28 directly into vessel 24 without requiring the withdrawal thereof by a pump.

As seen in FIG. 2, base 22 supports a motor 30 operatively connected through a coupling or other suitable drive connection to a pump 32 of the standard well-known manufacture. Mounted at the bottom of pump 32 is a fitting 34 in fluid communication with the intake port of pump 32, one end of fitting 34 being connected to a suction tube 36. Mounted on top of pump 32 is fitting 35 in fluid communication with outlet port of pump and one end of fitting 35 is connected to a flexible hose 37 for return delivery of filtered fat to the fryer pot 29. The suction tube 36 is inclined downwardly from pump inlet fitting 34 at a shallow angle and passes through and is welded in the side wall 38 of the sump 40 as shown in FIGS. 2 and 3. The sump 40 is preferably centrally located in the bottom of vessel 24 to facilitate the drainage of filtered liquid therefrom and it will be seen from FIG. 2 that the tube 36 inclines downwardly from pump intake 34 to sump 40 to facilitate draining of all residual liquid from the suction tube 36 pump 32 and hose 30 when the filter system is shut off.

As shown in FIG. 4, suction tube 36 has open end at the base of a depending portion 42 of the tube curved downwardly to form a bend 46 within the sump 40 opening with about one-sixteenth inch clearance above bottom 44 of the sump. A by-pass hole 48 is provided in the upper surface of the bend 46 in the tube 36 just above the level of solidified fat drained back into the sump as shown at 49 in FIGS. 3 and 4.

As shown in FIG. 2, the bottom of vessel 24 is formed with a peripheral step 50 having a horizontal wall 52 and a vertical cylindrical wall 54. A filter element 56, comprising a circular screen 58 having a marginal rim 60, is positioned across the bottom of vessel 24 and seated on the peripheral step 50 so that all hot liquid fat entering the vessel 24 must pass through filter element 56 to reach the sump 40 to be pumped out of vessel 24 and returned through flexible hose 37 to the fryer pot 29 as clean reusable fat suitable for cooking for human consumption.

A double-pole, single-throw electrical switch 58' is mounted on base 22 for operating the motor 30 and is suitable connected thereto by means not shown. The switch 58' in the arrangement shown is intended to operate motor 30 in but one direction to drive pump 32 to suck fluid through suction tube 36 and discharge the fluid into the fryer pot 29.

In operation, the cooking fat filter 20 is conveniently positioned below the spigot valve 28 of a fat fryer pot 29 containing contaminated liquid fat which is at an elevated temperature of approximately 300°F. The handle 27 of spigot valve 28 of the fryer pot 29 is thrown to open position and the fat vessel 24 begins to fill and the liquid immediately begins to seep through the filter element 56 so that sump 40 is soon flooded, immersing the bend 46 at suction end 42 of tube 36 in hot liquid fat.

Soon after all of the contaminated fat from fryer 29 is drained into vessel 24, the switch 58 is turned on to start pump 32 and a small portion of the hot liquid fat that is immersing the bend 46 of tube 36 immediately enters the by-pass hole 48 to heat the tube 36 and quickly melt and unplug the depending portion 42 of tube 36 of all solidified fat therein. Simultaneously the hot fat entering the sump 40 begins to melt the solidified fat therein while the heated tube end 42 melts the surrounding fat to provide passage to the open end of the tube and liquid transfer in return to the fryer 29 is begun, the fryer drain 28 having, meanwhile, been closed. The pump 32 is run until the sump 40 is drained to the inlet end of the suction tube 36 and the return of fat to the fryer 29 is completed. Then the switch 58 is opened to stop the pump 32 and the residual fat on the walls of the conduit system and pump 32 drains back to the sump 40 and solidifies upon cooling. The capacity of the sump 40 is sufficient to hold all of such residual fat drainage to a level below the opening 48 in the suction tube bend 46 and the filter system is thus ready for substantially immediate start-up whenever a cleansing of the hot fryer fat is desired.

Although but one specific embodiment of this invention has been herein shown and described, it will be understood that the details of construction shown may be altered or omitted without departing from the spirit of the invention as defined in the appended claims.

I claim:

1. A fast start-up cooking fat filter for use with a gravity-drain fryer pot having a pump with an inlet and a discharge outlet comprising:
   a. a base for supporting a vessel having a bottom;
   b. a sump having a bottom subtending from the vessel bottom;
   c. a filter means overlying the sump;
   d. a suction conduit in fluid communication with the pump inlet and having an opening adjacent the bottom of the sump; and
   e. a fluid by-pass means for providing fluid communication between the suction conduit and the vessel at a point below the inlet to the pump and above the said opening of the suction conduit in the sump at a level in the suction conduit above the level of all fat back-drained into said vessel from the said conduit and pump.

2. A cooking fat filter as in claim 1 wherein the suction conduit means comprises a suction tube downwardly inclined and extending into the sump and having a downwardly projecting bend therein providing for a depending portion having an end opening adjacent the bottom of said sump.

3. A cooking fat filter as in claim 1 wherein the by-pass means comprises a small hole.

* * * * *